Jan. 25, 1966  D. ENGELSMANN ET AL  3,230,848
CAMERA WITH MANUAL AND AUTOMATIC CONTROLS
Filed April 9, 1963  3 Sheets-Sheet 1

INVENTORS
DIETER ENGELSMANN
HUBERT HACKENBERG
ALFRED WINKLER
BY
Michael S. Striker
ATTORNEY

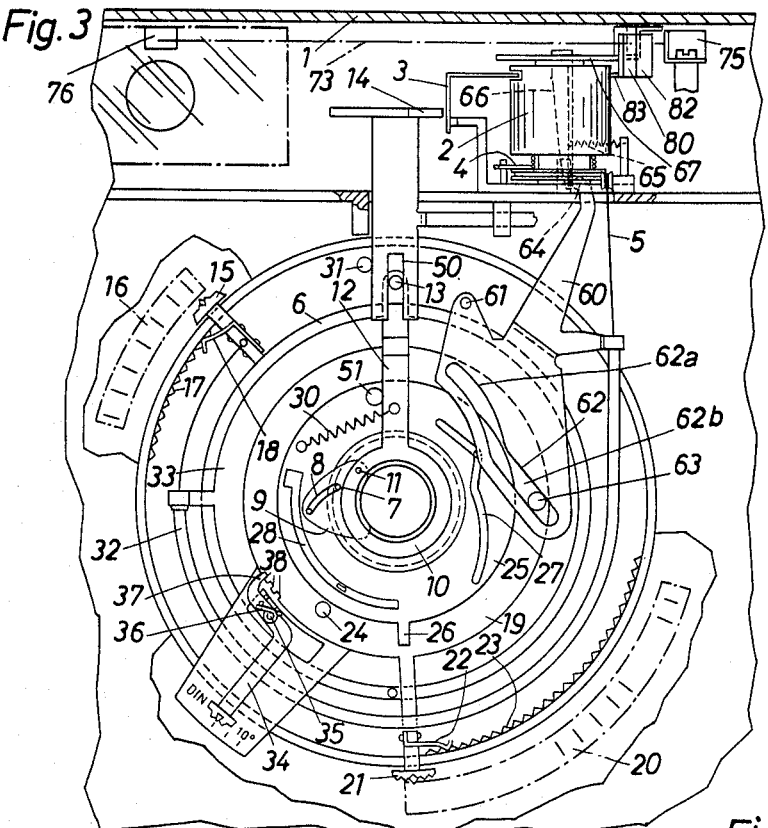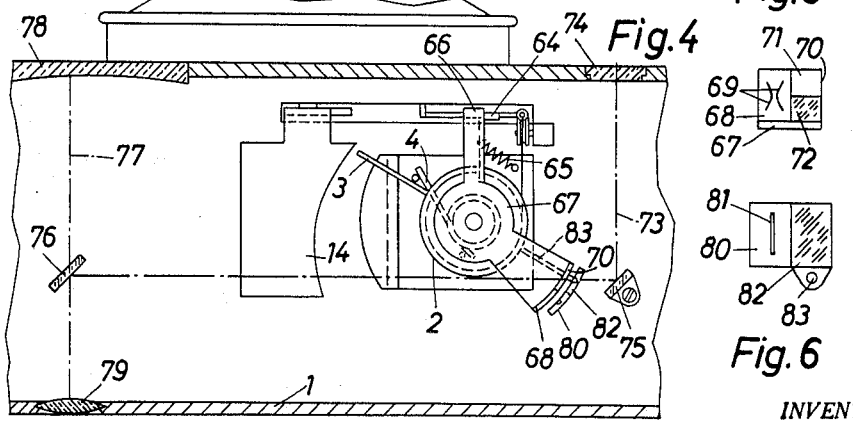

3,230,848
CAMERA WITH MANUAL AND AUTOMATIC CONTROLS
Dieter Engelsmann, Unterhaching, near Munich, Hubert Hackenberg and Alfred Winkler, Munich, Germany, assignors to Agfa Aktiengesellschaft, Leverkusen, Germany
Filed Apr. 9, 1963, Ser. No. 271,804
Claims priority, application Germany, Apr. 19, 1962, A 40,010; July 14, 1962, A 40,715
19 Claims. (Cl. 95—10)

The present invention relates to cameras.

More particularly, the present invention relates to cameras which are at least partly automatic in that they are capable of being automatically set to provide proper exposures.

In general, cameras of this type, if they are capable of providing both manual and automatic setting, carry with them certain distinct disadvantages. For example, in many cameras of this type it is necessary to make a preselection in the purely manual manner of either the exposure time or the aperture and then the non-selected exposure-determining factor will be automatically determined. Moreover, with cameras of this latter type relatively complex structures are required to carry out manual operation where the light meter structure used in connection with automatic operation was also used in connection with manual setting of the camera. Furthermore, in cameras of this latter type it is not possible to provide automatic setting of both the aperture and the diaphragm as well as manual setting thereof.

It is accordingly a primary object of the present invention to provide a camera of the above type which on the one hand is capable of automatically setting both the aperture and the exposure time and which on the other hand is capable of having the aperture and exposure time manually determined with the same light meter structure which is used during automatic setting of the camera also being used to indicate proper setting of the camera manually.

It is furthermore an object of the present invention to provide a structure which can operate in the above manner while at the same time being exceedingly simple and reliable in operation.

It is furthermore an object of the present invention to provide a structure in which elements such as the light meter and moving coil member thereof move through relatively small distances so that the entire structure can be located in a small space.

A still further object of the present invention is to provide a structure of the above type wherein the indicating structure of the light meter assembly moves through such a small distance that it becomes feasible to project an image of indexes and the like into the viewfinder to be rendered visible together with the subject.

In addition, it is an object of the present invention to provide for a structure of the above type signals capable of warning the operator when a proper exposure can be made or when the lighting conditions are such that a proper exposure will not be made.

With the above objects in view, the invention includes, in a camera, an adjustable means for determining, at least in part, the extent to which film in the camera is exposed. A light-responsive means is operatively connected to the adjustable means for automatically setting the latter according to the lighting conditions, and this light-responsive means includes an electrical instrument which is movably carried by a support means and which has a moving coil member which is movable along a predetermined path with respect to the remainder of the instrument and which automatically assumes a position according to the lighting conditions. An index means is located at that part of the path of movement of the moving coil member to which it must be moved in order to zero its deflection according to the lighting conditions, and a manually operable means coacts with the adjustable means for manually setting the latter. A transmission means connects this manually operable means to the electrical instrument for moving the latter with respect to its support means in response to manual setting of the adjustable means, and thus it becomes possible for the operator to align the moving coil member with the index means in order to provide a proper manual setting of the adjustable means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 shows a variation of the structure of FIG. 1, also as seen from the rear;

FIG. 4 is a top plan view of the structure of FIG. 3 with the top wall of FIG. 3 removed so as to better illustrate the structure therebeneath;

FIG. 5 shows in elevation part of an index and indicating structure of FIGS. 3 and 4; and FIG. 6 shows another part of an index and indicating structure of FIGS. 3 and 4 which cooperates with the part thereof which is illustrated in FIG. 5.

Figure 1:
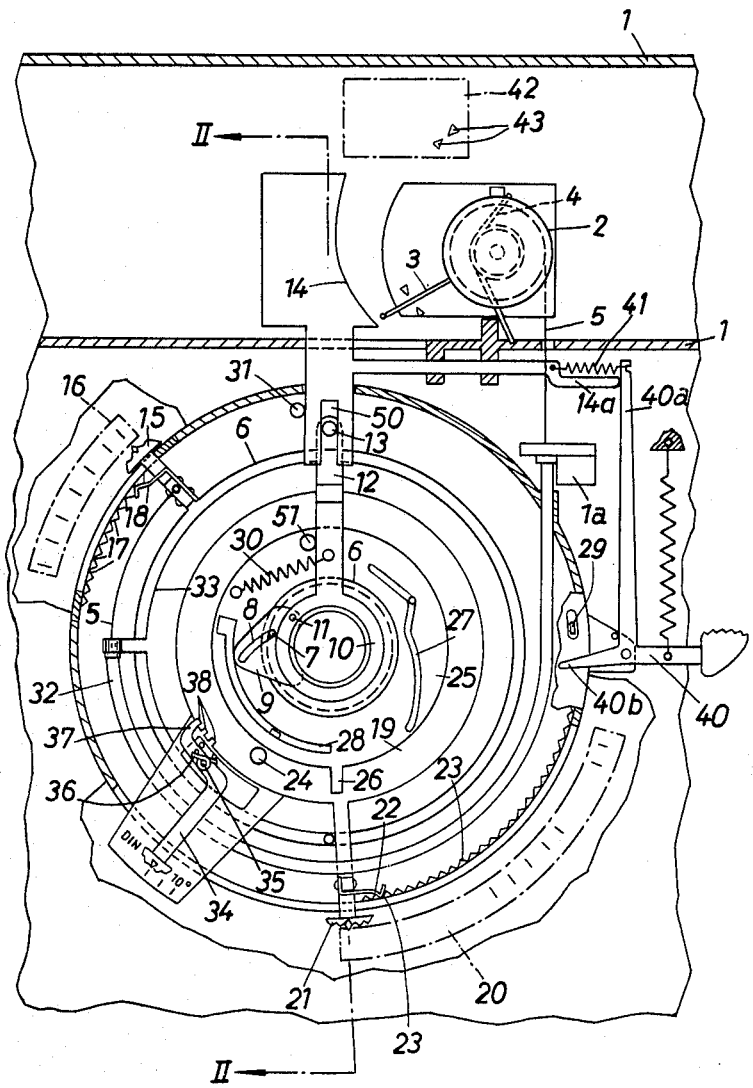
FIG. 1 is a partly diagrammatic, fragmentary elevation showing a structure according to the invention as seen from the rear.

Referring now to FIG. 1, there is illustrated at the upper inner portion of the camera housing 1 an automatic means for automatically setting the camera, this automatic means being light-responsive and including an electrical instrument 2 which includes a moving coil member 3, as is well known in the art, this electrical instrument being, for example, a galvanometer which is actuated from a photocell or other suitable photosensitive device, as is also well known in the art. The light-responsive means includes also a scanning means 14, as described below. The electrical instrument 2 is supported for movement by a suitable support means such as the wall which is shown in FIG. 1, and this support means supports the electrical instrument 2 for rotary movement in its entirety about its own axis, and a spring 4 is coiled about a portion of the housing of the electrical instrument and urges the latter to turn in a counterclockwise direction, as viewed in FIG. 1. A totalizing transmission means has an output member which is operatively connected to the electrical instrument 2, and this transmission means is illustrated as in the form of an elongated flexible sheath 32 through which an elongated flexible core 5 slidably extends, to form a structure similar to a Bowden wire or flexible shaft transmission, and this elongated flexible core member 5 forms at one end portion the output member of the transmission and is connected to the instrument 2. Thus, if the upper right portion of the core member 5 is pulled downwardly, as viewed in FIG. 1, the instrument 2 will turn in a clockwise direction in opposition to the spring 4, while if the upper right portion of the core 5 visible in in FIG. 1 is moved upwardly the instrument 2 will be turned by spring 4 further in a counterclockwise direction, as viewed in FIG. 1. The end of the flexible core or wire 5 which is distant from the electrical instrument 2 is fixed to a manually operable means 15 which is connected to a ring 6 for turning the latter, this ring 6 having in cross section the configuration shown most clearly in FIG. 2. The inner tubular portion of the ring 6 fixedly carries a plurality of pins 7 which thus turn with the ring 6, and these pins 7 respectively extend into the curved slots 8 of a plurality of diaphragm blades 9, only one pin 7 and one blade 9 being shown in FIG. 1 for the sake of clarity. A second ring 10 is supported for rotation about the optical axis, coaxially with the ring 6, and this second ring 10 fixedly carries a plurality of pins 11 respectively received in bores of the several blades 9, so that the blades 9 are capable of pivoting about the pins 11. Thus, with this construction if the ring 6 remains stationary and the ring 10 turns the diaphragm blades 9 will be adjusted to adjust the aperture of the camera, and also if the ring 10 remains stationary and instead the ring 6 turns then the blades 9 will also be adjusted in order to set the exposure aperture. Thus, the blades 9 form an adjustable means for determining, at least in part, the extent to which film in the camera is exposed, and the ring 6 together with the manually-engageable element 15 fixed thereto forms a manually operable means which is operatively connected to the adjustable means 9 for adjusting the later manually. The ring 10 forms part of a light-responsive structure which is operatively connected to the adjustable means 9 for automatically setting the latter according to the lighting conditions, and of course this light-responsive structure includes the electrical instrument 2 together with the moving coil member 3 as well as the scanning means 14. As is shown in FIG. 1, as well as FIG. 2, the ring 10 is fixed with a radially projecting arm 12 which carries a pin 13 received in a slot 50 formed in an extension of the scanning means 14 which, when it moves to the right, as viewed in FIG. 1, engages with its curved scanning edge a portion of the moving coil member 3 which extends parallel to the optical axis normally to the plane of FIG. 1. Thus, when the scanning means 14 is shifted to the right, as viewed in FIG. 1, its curved edge will engage the free end of the member 3 which assumes an angular position according to the lighting conditions and which thus limits the movement of the scanning means to a position determined by the lighting conditions. As a result of the pin-and-slot connection 13, 50 the arm 12 and the ring 10 will necessarily be turned under these conditions through an angle which is also determined in accordance with the lighting conditions, and thus the adjustable means 9 will be automatically set in accordance with the lighting conditions. The scanning means 14 has an extension extending through suitable bearings which are stationary and which support the scanning means for movement to the right and left, as viewed in FIG. 1, and a stationary stop pin 31 engages an edge of the scanning means 14 to limit the movement thereof to the left, as viewed in FIG. 1, a spring 41 being connected to the scanning means 14 for advancing the latter to the right, as pointed out below. The manually-engageable portion 15 of the manually operable means 6, 15 cooperates with a scale 16 of diaphragm apertures, and this element 15 is placed by the operator in the position shown in FIG. 1 at one end of the scale 16 when it is desired to have the camera set automatically. The extension of the ring 6 which carries the manually-engageable element 15 also carries a leaf spring 18 which cooperates with teeth 17 for releasably holding the manually operable means 6, 15 in a selected position in alignment with a selected graduation of the scale 16, and thus the element 17 and 18 form a releasable holding means for releasably holding the manually operable means 6, 15 in a selected position.

The structure includes a second manually operable means 19 in the form of a ring also supported for rotary movement about the optical axis and having a radial extension accessible at the exterior of the objective housing where it carries a manually-engageable member 21 which cooperates with a scale 20 carrying exposure-time graduations. However, at the lower left portion of the scale 20, as viewed in FIG. 1, there are no graduations except a single end graduation with which the manually operable means 19 is aligned in the position of the parts shown in FIG. 1, this graduation indicating proper setting of the manually operable means 19 for automatic operation of the camera, and the operator must turn element 21 together with the ring 19 in a counterclockwise direction, as viewed in FIG. 1, through a substantial angle before reaching the first graduation of exposure times of the scale 20.

The exposure-time setting structure is formed by a second adjustable means which includes a rotary ring 25 formed with an elongated camming slot 27 cooperating with a pin of a lever of a known retarding structure which is capable of retarding the shutter of the camera in accordance with the angular position of the ring 25, and this ring is also formed with an arcuate slot 28 which is enlarged at one end to enable bulb exposures to be made, as is also well known in the art, bulb exposures providing exposure times determined manually by the operator in accordance with the length of time that the operator manually holds the shutter open. The adjustable means 25 carries an extension 26 which is located in the path of turning of a pin 24 which is fixed to the manually operable means 19 for turning movement therewith, so that the manually operable means 19 must be turned through an angular distance which will place the pin 24 in engagement with the extension 26 before the adjustable means 25 will be moved in order to change the exposure time. When the ring 19 is turned manually by way of element 21 beyond the position where the pin 24 engages the extension 26, the ring 19 can be placed at any selected position providing a selected exposure time, and in this way the manually operable means 19 is capable of manually adjusting the adjustable means 25 which determines the exposure time. A leaf spring 22 is fixed to the ring 19 for turning movement therewith and cooperates with teeth 23 so that in this way also a releasable holding means is provided for releasably holding the ring 19 in a selected angular position.

Because the structures adjusted by the turning of the ring 25 are purely conventional and well known, they are not illustrated. However, FIG. 1 does show the release member 29 of the shutter, the shutter being tripped to make an exposure when the member 29 is displaced upwardly, as viewed in FIG. 1, through a short distance.

A spring-pressed coupling means is provided for releasably coupling the adjustable means 25 to the ring 10 for rotary movement therewith, and this spring-pressed coupling means includes a pin 51 fixed to the ring 25 for rotary movement therewith and a relatively strong spring 30 fixed to the ring 25 and to the arm 12 for maintaining the pin 51 in engagement with an edge of the arm 12. Thus, when the arm 12 turns in a clockwise direction, as viewed in FIG. 1 during automatic setting of the camera, the spring 30 will maintain the pin 51 in engagement with the arm 12 so that the ring 25 necessarily follows the rotary movement of the ring 10, and thus both of the adjusting means will be simultaneously set automatically.

A third manually operable means is provided, this latter means serving to set into the camera the factor of film speed. One end of the flexible sheath 32 through which the core 5 extends is fixed to the ring 33. The other end of the sheath 32 is located in a predetermined position by the positioning means 1a which in the illustrated example fixes the location of the end of the sheath 32 distant from the ring 33. The sheath 32 is maintained in an arcuate or loop-shaped configuration and this sheath 32 is longitudinally incompressible, so that when the left end of the sheath 32, as viewed in FIG. 1, is displaced in a counterclockwise direction the sheath 32 will change its arcuate configuration but will not become compressed or shorter in length. The manually operable means 33 for introducing the factor of film speed carries a pivot pin 35 on which a lever 34 is pivotally mounted, and the pin 35 extends through an opening of a stationary plate carrying a scale of film speeds and with which an index at the free end of the lever 34 can be aligned to provide a selected film speed. The lever 34 is located in the plane of the manually operable means 19 and a spring 36 urges the lever 34 to turn about the pin 35 in a clockwise direction, as viewed in FIG. 1, so that the free end 37 of the lever 34 will enter into one of a plurality of notches 38 formed in the periphery of the ring 19. In accordance with the film speed which is selected by the operator the free end 37 will be located in a predetermined one of the notches 38, so that with this construction a releasable lock means is provided for releasably locking the elements 19 and 33 to each other in selected angular positions relative to each other.

As was pointed out above, the parts are shown in FIG. 1 in the position they take for automatic setting of the camera. In this case the operator turns the elements 15 and 21 to the ends of the scales 16 and 20, as shown in FIG. 1, in order to place the camera in the posititon ready for automatic setting. In order to introduce the film speed, the operator will turn the lever 34 about the pin 35 and not only will the lever 34 in this way become released from the ring 19, in addition the ring 33 will be manually turned. The sheath 32 remains either in the position illustrated in FIG. 1 where it provides a film speed setting corresponding to a graduation at one end of the scale of film speeds, or if a different film speed setting is required the operator will turn the manually operable means 33 in a counterclockwise direction, as viewed in FIG. 1, thus displacing the end of the sheath 32 which is fixed to the ring 33 also in a counterclockwise direction. Inasmuch as the positioning means 1a fixedly determines the location of the other end of the sheath 32, it is apparent that the counterclockwise turning of the ring 33 will change the configuration of the sheath 32 causing the lower end thereof, as viewed in FIG. 1, to become displaced downwardly, as viewed in FIG. 1, and since the flexible core 5 passes through the sheath 32, this change in the configuration of the sheath 32 is transmitted through the core 5 to the instrument 2 which as a result under these conditions turns in a clockwise direction in order to introduce the factor of film speed.

Assuming now that the film speed has been set into the camera, so that the initial angular position of the instrument 2 has been determined in this way, the operator will turn the lever 40 in a clockwise direction, as viewed in FIG. 1, in order to make an exposure. The arm 40a of the lever 40 is connected to the spring 41 which is in turn connected to the scanning means 14, as pointed out above, so that in this way the manual turning of the lever 40 will displace the scanning means 14 to the right, as viewed in FIG. 1, until the scanning edge thereof engages the moving coil member 3 the angular position of which is determined by the lighting conditions, so that in this way the ring 10 is turned to an angular position determined by the lighting conditions, and of course the spring-pressed coupling means 51, 30 causes the ring 25 to follow the turning of the ring 10, so that the exposure time is also automatically set by the displacement of the scanning means 14 into engagement with the moving coil member 3. The continued turning of the lever 40 by the operator will cause the end 40b thereof to engage the shutter release member 29, after the scanning means 14 has engaged the moving coil member 3, so that the exposure time and aperture have already been automatically set, and the movement of the element 29 will of course trip the shutter in order to make an exposure. As apparent from FIG. 1, a spring 41 interconnects the arm 14a of the scanning means 14 with the arm 40a of the lever 40 so that upon return of the lever 40 to its rest position, the scanning means 14 is also displaced back to its rest position shown in FIG. 1.

The structure can also be used to set the pair of adjustable means 9 and 25 manually while using the electrical instrument 2. In this case there is located on a suitable member of the viewfinder 42 in the path of movement of the pointer 3 an index in the form of a pair of marks 43 with which the movable coil member 3 must be aligned in order to zero the deflection thereof in accordance with the lighting conditions, so that the operator will know during manual setting of the camera that when the moving coil member 3 becomes positioned between the elements of index 43, as will be apparent in the viewfinder, then the camera is properly set in accordance with the lighting conditions. In order to set the camera manually the operator will turn element 21 in a counterclockwise direction, as viewed in FIG. 1, at least up to the first exposure-time graduation of the scale 20, and due to the releasable lock means 37, 38 the ring 33 will follow the movement of the ring 19 at this time causing the sheath 32 to change its configuration in such a way that when the index on element 21 reaches the first exposure-time graduation the core 5 will have turned the instrument 2 through such an angle that the moving coil member 3 will be aligned with the index 43 when no light is received by the light-responsive means. Of course, light is admitted to the light-responsive means so that the moving coil member 3 will have a position determined by the lighting conditions, and by manually turning the instrument 2 through the totalizing transmission means 5, 32 the deflected moving coil member 3 can be aligned with the index 43 for proper setting of the camera. Of course, when the ring 19 is turned beyond the position where pin 24 engages extension 26, the ring 19 will turn in opposition to the spring 30 displacing the pin 50 when away from the arm 12, and the latter will not be able to turn because the stop pin 31 engages the extension of the scanning means 14, so that the spring 30 is simply tensioned further and the scanning means does not follow the movement of the ring 25. During subsequent actuation of the lever 40 to make an exposure, the scanning means 14 will not be displaced because the spring 30 is so much stronger than the spring 41 that even though the latter is tensioned it will still be incapable of overcoming the force of the spring 30, so that at this time the scanning means remains stationary. Thus, during manual setting of the camera the ring 10 remains stationary. The factor of film speed is introduced into the camera in exactly the same way irrespective of whether the camera is operated automatically or manually. After the element 21 has been turned to introduce the selected exposure time the element 15 is turned by the operator to manually introduce a selected aperture. Assuming that the exposure time has been preselected, then the operator will turn element 15 until the moving coil member 3 is aligned with the index 43. Movement of element 15 causes displacement of the flexible core 5 of the totalizing transmission means, and this movement is transmitted to the instrument 2 which thus turns, and when the operator has aligned the moving coil member 3 with the index 43 the operator knowns that the camera has been properly set in accordance with the lighting conditions. Of course, if it is not possible to align the moving coil member 3 with the index 43, the operator can change the selected exposure time to a value which will enable alignment of the moving coil member with the index. Of course, the operator can preselect the aperture by aligning element 15 with a selected graduation of scale 16, and then element 21 can be moved until the moving coil member 3 is aligned with the index 43. As was pointed out above, the spring 30 is so much stronger than the spring 41 that the scanning means 14 will not be displaced at this time.

The adjustment of the electrical instrument 2 thus can be brought about by way of turning of the ring 33 which is locked at one of a plurality of selected positions with the ring 19, and thus the turning of the ring 33 will change the configuration of the sheath 32, and since the core 5 must follow this change of configuration the instrument 2 will be correspondingly adjusted. When the configuration of the sheath 32 changes during a change in the film speed which is placed in the camera, the sheath 32 acts through the flexible core 5 to position the instrument 2 accordingly. Also, during adjustment of the ring 19 to change the exposure time, the ring 33 and the sheath 32 necessarily turn with the ring 25 so that the sheath 32 again introduces the selected exposure time through the flexible core 5. Of course, the turning of element 21 from the automatic position of FIG. 1 to the first graduation of the scale 20 will result in deflection of the sheath 32 sufficient to turn the instrument 2 for placing the moving coil member 3 in alignment with the index 43 in the starting position of the moving coil member 3 where no light is received by the light-responsive structure, and of course the moving coil member 3 will remain in this position if there is so little light available that it will not move. On the other hand, when the element 21 is returned to the position of FIG. 1 for automatic setting of the camera the configuration of the sheath 32 will change to that which is illustrated in FIG. 1 and the spring 4 will be capable of returning the instrument 2 to the angular position of FIG. 1 where the moving coil member 3 turns in the range in which it can be engaged by the scanning means 14.

Naturally various details can be changed. For example, the releasable holding devices 22, 23 and 17, 18 can have different structures. Moreover, instead of rings 19 and 33 it is possible to use segments of rings or levers. Moreover, the connection between the diaphragm adjusting ring 10 and the scanning means 14 can be through a different type of transmission than the pin-and-slot connection 13, 50. Moreover, instead of a pin 24 cooperating with the projection 26 it is possible for the ring 25 to carry a pin which cooperates with the projection of the ring 19. Moreover, instead of providing springs 30 and 41 which necessarily have a predetermined relationship with respect to each other, it is possible to use a releasable detent structure for releasably holding the scanning means 14 in its initial position shown in FIG. 1 during manual setting of the camera in the manner described above.

It is thus apparent that with the above-described structure of the invention, not only is it possible to automatically set both the exposure time and aperture, but in addition it is possible to use the same light meter structure which is used during automatic setting in order to manually set the camera, and this result is brought about without providing a special follower member to follow the position of the moving coil member 3 and of course without any special structure for advancing such a follower member in response to manual setting. The totalizing transmission means 5, 32 is capable of positioning the light meter instrument 2 at an angular position determined by the combination of the settings of the pair of manually operable means 6 and 19, and in addition the manually operable means 33 used for introducing the film speed also has its setting transmitted to the instrument 2 through the totalizing transmission means formed by the sheath 32 and the core 5 passing therethrough.

Figure 2:
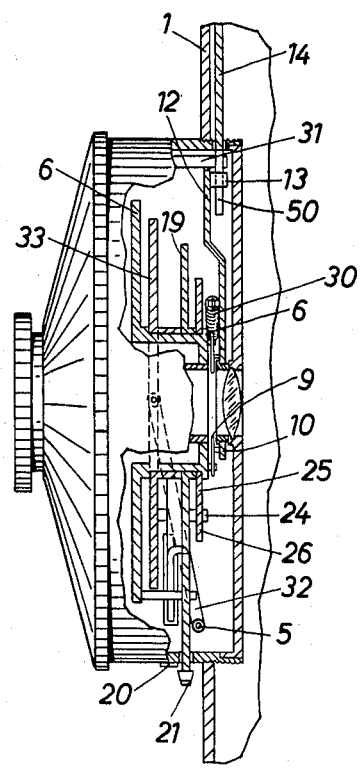
FIG. 2 is a sectional elevation taken along line II—II of FIG. 1 in the direction of the arrows.

Although with the structure of FIGS. 1 and 2 described above all of the above advantages are produced, it is to be noted that it is necessary to turn the instrument 2 through a considerable angle simply during changeover between automatic and manual operation, and as a result a considerable space is required for the parts. The embodiment of the invention which is illustrated in FIGS. 3–6 retains all of the advantages of the embodiment of FIGS. 1 and 2 and in addition greatly reduces the extent of turning required for the instrument 2, and furthermore with the embodiment of FIGS. 3–6 it is possible to project into the viewfinder images of signals which will indicate to the operator such information as whether or not the lighting conditions are such that a proper exposure can be made.

Referring to FIGS. 3 and 4, it will be seen that all of the structure described above in connection with FIGS. 1 and 2 is included, as well as additional structure described below, but in FIGS. 3 and 4 the electrical instrument 2 is supported by a suitable support means, formed by a stationary wall of the camera, for rotation about a vertical axis rather than a horizontal axis, and of course the spring 4 is horizontally positioned in FIG. 3 in order to urge the instrument 2 to turn about the vertical axis of FIG. 3. The manner in which the free end of the moving coil member 3 is bent is clearly apparent from FIG. 3, and of course in this embodiment the scanning means 14 is horizontally positioned so as to cooperate properly with the moving coil member 3.

In the embodiment of FIGS. 3–6, instead of a positioning means 1a which provides only a fixed, permanent position for one end of the sheath 32, there is provided a positioning means 60 capable of changing the position of the end of the sheath 32 distant from the ring 33. This positioning means 60 is in the form of a plate supported for turning movement by a stationary pivot 61 and formed with an elongated slot 62b having an edge 62 which forms a camming means for determining the position of the plate 60 in the manner described below. The ring 19 carries a pin 63 which is received in the slot 62b and which engages the edge 62 for determining the angular position of the positioning means 60 and thus determining the position of the end of the sheath 32.

A rotary carrier member 67 is supported for rotation coaxially with the electrical instrument 2, and this member 67 has a downwardly directed projection 66 engaged by a free end 64 of the plate 60, a spring 65 (FIG. 4) being connected to portion 66 of the carrier 67 for urging the latter to turn in a clockwise direction ase viewed in FIG. 4, so as to maintain the projection 66 in engagement with the free end 64 of the plate 60. While the carrier 67 is coaxial with the instrument 2 it is capable of turning in a manner entirely independent of the turning of the instrument 2. It should be noted that in FIGS. 3 and 4 the flexible core 5 is guided over a suitable pulley into connection with the instrument 2 for determining, in cooperation with the spring 4, the angular position of the instrument 2 in accordance with the combination of the manual settings, as described above. At one end, the rotary carrier member 67 carries an index means 69 (FIG. 5) and besides the index means 69 an indicating means 70 having an uncolored, clear, transparent portion 71 and also a transparent portion 72 which is preferably tinted green for a purpose described below. As is apparent from FIGS. 3 and 4, light can pass through a window 74 at the front of the camera to be directed along the path 73 determined by reflectors 75 and 76. In this way the light which enters the window 74 is reflected by the reflector 75 horizontally to the semi-transparent reflector 76 located on the optical axis 77 of the viewfinder, this viewfinder including the ocular 79 and the objective 78, so that while the operator can observe the subject through the viewfinder, an image of the indicating or indexing structure, as described below, will also be made visible to the operator.

The moving coil member 3 in the embodiment of FIGS. 3 and 4 carries a projection 83 on which is mounted a transparent portion 80 (FIG. 6) carrying an index 81 which cooperates with the index 69 in the manner described below, and beside the index 81 the moving coil portion 83 carries a colored transparent field 82 which forms a second indicating means and which is preferably colored red. As is apparent from FIG. 3, the elevation of the structure shown in FIG. 6 is such that it overlaps the structure shown in FIG. 5 when the parts have with respect to each other the angular position indicated in FIG. 4.

The parts are shown in FIG. 3 set for automatic setting of the camera. Thus, when the operator turns the member 21 to the automatic position, as described above, the pin 63 will cooperate with the camming slot 62b for positioning the plate 60 in the position illustrated in FIG. 3, and in this position the spring 65 will locate the carrier 67 in an angular position where the portion 70 carried by the carrier 67 will be aligned with the optical axis 73 of the structure which cooperates with the viewfinder, so that the optical axis 73 in this position of the parts passes through the field 70. The moving coil member 3 is shown in FIG. 4 in its starting position which corresponds to no light being received by the light-responsive means. It will be noted that in this position the indicating means 82 is also aligned with the optical axis 73. If there is insufficient light available to provide a proper exposure, then the moving coil member 3 will remain substantially in the position shown in FIG. 4, and the operator will see the red color of the indicating means 82 in the viewfinder and will know that a proper exposure cannot be made. However, if there is sufficient light, the moving coil 3 will be displaced with respect to the instrument 2 in a counterclockwise direction, as viewed in FIG. 4, thus locating the red field 82 beyond the field 70, so that the operator will now see the green color in the field of the viewfinder and will know that a proper exposure can be made. Of course, if the moving coil member 3 is displaced through only a short distance then the index 81 may also be visible at this time, but in any event the red color of the indicating means 82 will not be visible so that the green color of the indicating means 72 will be clearly visible and the operator will know that there is sufficient light for a proper exposure.

In the event that it is desired to manually set the camera in accordance with the position of the moving coil member 3 as determined by the lighting conditions, then the operator will again displace the member 21, as described above, so that the ring 19 will turn until the pin 24 engages the projection 26 before any change in the exposure time will be made. However, at this time the turning of the ring 19 causes the pin 63 to cooperate with the edge 62 for turning the plate 60, so that the positioning means 60 will now change the position of the end of the sheath 32 which is distant from the ring 33. Of course, the turning of the ring 19 at this time is transmitted through the releasable lock structure 37, 38 to the ring 33 which thus turns together with the ring 19. The inclination of the camming edge 62 is such that during angular turning of the ring 19 in order to place the pin 24 in engagement with the projection 26 and thus locate the index of member 21 in alignment with the first graduation of the scale 20, the free end of the sheath 32 which is connected to the plate 60 will advance to the same extent and in the same direction as the free end of the sheath 32 which is connected to the ring 33, so that in this way during the changeover from automatic to manual operation only the sheath 32 is advanced along the core 5 and no movement is transmitted to the instrument 2, so that the latter remains stationary and it is not necessary to provide sufficient space to accommodate turning of the instrument during changeover between manual and automatic operation. When the pin 24 engages the projection 26 the pin 63 has reached the end of the camming edge 62 and is at the beginning of the arcuate portion 62a of the camming slot of the plate 60, and the curvature of this arcuate portion is such that during continued turning of the ring 19 while the adjustable means 25 is displaced for changing the exposure time the pin 63 will simply ride along the arcuate portion 62a without producing any angular turning of the plate 60 so that the end of the sheath 32 fixed thereto will now remain in the position to which it was displaced during the changeover from automatic to manual operation.

During the turning of the plate 60 at this time the end portion 64 thereof of course cooperates with the projection 66 of the carrier 67 for displacing the latter in a counterclockwise direction, as viewed in FIG. 4, and when the pin 24 engages the projection 26 so as to terminate the movement of the plate 60 in the manner described above the carrier 67 will have been turned to such an angle that the index 69 will be positioned along the optical axis 73 of the structure which cooperates with the viewfinder, so that at this time the operator will see the index means 69 in the viewfinder field.

Of course, when the ring 19 is turned beyond the position where the pin 24 engages the projection 26 the result will be a change in the curvature of the sheath 32, as described above, and of course this change will be transmitted through the flexible core 5 to the instrument 2 for changing the angular position of the latter exactly as described above in connection with FIG. 1. On the other hand, the movement of element 15 will be transmitted through the flexible core 5 to the instrument 2, also as described above, so that the sheath 32 and the core 5 form in the embodiment of FIGS. 3 and 4 also a totalizing transmission means capable of positioning the instrument 2 according to the combined positions of the pair of manually operable means which respectively manually set the exposure time and aperture, of course the film speed having previously been introduced in the manner described above. With the embodiment of FIGS. 3 and 4, during manual setting of the camera the operator will preselect either the exposure time or the aperture and then the non-preselected one of these exposure-determining factors will be manually set until the index 81 is aligned with the index 69, and of course the operator can see this alignment in the viewfinder field. It is to be noted that the displacement of the plate 60 during turning of the pin 24 into engagement with the projection 26 locates the index 69 at the position which the index 81 takes when no light reaches the light meter structure, so that during manual setting the deflection of the moving coil member 3 is zeroed in order to provide proper setting in accordance with the lighting conditions, in exactly the manner described above in connection with FIG. 1.

Thus, it will be seen that with the embodiment of FIGS. 3–6 not only is the extent of turning required for the instrument 2 reduced so much that the entire structure can be located in a smaller space, but in addition all of the indicating and index members turn through such a small angle during changeover that it is possible to project images of the indexes and indicating means into the field of the viewfinder. However, if desired, it is possible to render the index 69 and field 70 carried by the carrier 67 as well as the structure of FIG. 6 carried by the moving coil member visible through a suitable window of the camera.

It will be understood that each of the elements described above, or two or more together, may also find a useful application in other types of cameras differing from the types described above.

While the invention has been illustrated and described as embodied in automatic or manual cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential char-

What is claimed as new and desired to be secured by Letters Patent is:

1. In a camera, in combination, support means; adjustable means for determining, at least in part, the extent to which film in the camera is exposed; light-responsive means operatively connected to said adjustable means for automatically setting the latter according to the lighting conditions, said light-responsive means including an electrical instrument movably carried by said support means and including a moving coil member which is movable along a predetermined path with respect to the remainder of the instrument and which automatically assumes a position according to the lighting conditions; index means located at that part of said path to which said moving coil member must be moved to zero its movement according to the lighting conditions; manually operable means coacting with said adjustable means for manually setting the latter; and transmission means connecting said manually operable means to said instrument for moving the latter with respect to said support means in response to manual setting of said adjustable means, so that the operator can align said moving coil member with said index to provide a proper manual setting of said adjustable means, said transmission means consisting of a flexible sheath and an elongated flexible core member extending through and beyond said sheath.

2. In a camera, in combination, support means; adjustable means for determining, at least in part, the extent to which film in the camera is exposed; light-responsive means operatively connected to said adjustable means for automatically setting the latter according to the lighting conditions, said light-responsive means including an electrical instrument supported for rotary movement by said support means and including an angularly movable moving coil member which turns along a predetermined path with respect to the remainder of the instrument and which automatically assumes a position according to the lighting conditions; index means located at that part of said path to which said moving coil member must be turned to zero its movement according to the lighting conditions; manually operable means coacting with said adjustable means for manually setting the latter; transmission means connecting said manually operable means to said instrument for turning the latter with respect to said support means in response to manual setting of said adjustable means, so that the operator can align said moving coil member with said index to provide a proper manual setting of said adjustable means, said transmission means consisting of an elongated flexible sheath and an elongated flexible core member extending through and beyond said sheath; and second adjustable means for introducing into the camera the factor of film speed, said second adjustable means being operatively connected to said instrument for angularly positioning the latter with respect to said support means according to the speed of the film which is used in the camera.

3. In a camera, in combination, support means; a pair of adjustable means for determining, at least in part, the extent to which film in the camera is exposed; light-responsive means operatively connected to at least one of said adjustable means for automatically setting the latter according to the lighting conditions, said light-responsive means including an electrical instrument movably carried by said support means and including a moving coil member which is movable along a predetermined path with respect to the remainder of the instrument and which automatically assumes a position according to the lighting conditions; index means located at that part of said path to which said moving coil member must be displaced to zero its movement according to the lighting conditions; a pair of manually operable means respectively coacting with said pair of adjustable means for manually setting said pair of adjustable means; and totalizing means operatively connected to said pair of manually operable means for totalizing the movements thereof by the operator, said totalizing means, consisting of an elongated flexible sheath and an elongated flexible core member extending through and beyond said sheath, said totalizing means including an output member, formed by an end of said core member, connected to said instrument for displacing the latter with respect to said support means according to the combined manual settings of said pair of adjustable means, so that the operator can align said moving coil member with said index to provide a proper manual setting of said pair of adjustable means.

4. In a camera, in combination, a pair of adjustable means for respectively adjusting the exposure time and aperture of the camera; a third adjustable means for introducing into the camera the factor of film speed; support means; light-responsive means operatively connected to said pair of adjustable means for automatically setting the same according to the lighting conditions, said light-responsive means including an electrical instrument movably carried by said support means and having a moving coil member which is movable along a predetermined path with respect to the remainder of the instrument and which automatically assumes a position according to the lighting conditions; index means located at that part of said path to which said moving coil member must be moved to zero its movement according to the lighting conditions; three manually operable means respectively coacting with said pair of adjustable means and said third adjustable means for manually setting all three adjustable means, respectively; and totalizing transmission means consisting of an elongated flexible sheath and an elongated flexible core member extending through and beyond said sheath, said transmission means having a pair of input members, formed by an end of said core member and an end of said sheath, respectively connected to the manually operable means which coacts with one of said pair of adjustable means and the manually operable means which coacts with said third adjustable means for totalizing the movements of the latter two manually operable means, said totalizing transmission means having an output member formed by the other end of said core member, operatively connected to said instrument for moving the latter relative to said support means according to the combined movements of said two manually operable means; and releasable lock means releasably locking the manually operable means which coacts with the other of said pair of adjustable means with said manually operable means which coacts with said third adjustable means at one of a plurality of selectable positions, so that when said pair of manually operable means are manipulated for manually setting said pair of adjustable means said totalizing transmission means will move said instrument to enable the operator to align said moving coil thereof with said index to provide proper manual settings of said pair of adjustable means.

5. In a camera, in combination, support means; a pair of adjustable means for determining, at least in part, the extent to which film in the camera is exposed; light-responsive means operatively connected to at least one of said pair of adjustable means for automatically setting said one adjustable means according to the lighting conditions, said light-responsive means including an electrical instrument movably carried by said support means and including a moving coil member which is movable along a predetermined path with respect to the remainder of the instrument and which automatically assumes a position according to the lighting conditions; index means located at that part of said path to which said moving coil member must be moved to zero its movement according to the lighting conditions; a pair of manually operable means respectively coacting with said pair of adjustable means for manually setting them; and totalizing transmission means connecting said pair of manually operable means to said instrument for moving the latter with respect to said support means in response to manual setting of said pair of adjustable means, so that the operator can align said moving coil member with said index to provide a proper manual setting of said adjustable means, said totalizing transmission means including an elongated sheath and an elongated flexible core member extending through and beyond said sheath, said elongated flexible core member having one end connected to said instrument for moving the latter and the opposite end of said core member and one end of said sheath being respectively fixed to said pair of manually operable means; and positioning means determining the position of the other end of said sheath, whereby said core member totalizes its own movements and deflections of said one end of said sheath to position said instrument accordingly, said sheath having an arcuate configuration.

6. In a camera as recited in claim 5, said positioning means fixing said other end of said sheath in a position in which said other end of said sheath remains permanently, said sheath having an arcuate configuration, whereby movement of the manual operable means connected to said core member is transmitted by the core member through the sheath to the instrument while movement of the manually operable means connected to said one end of said sheath changes the curvature of the latter to also transmit the movement of said one end of said sheath through said core to said instrument.

7. In a camera as recited in claim 5, said positioning means fixing said other end of said sheath in a position in which said other end of said sheath remains permanently, said sheath having an arcuate configuration, whereby movement of the manual operable means connected to said core member is transmitted by the core member through the sheath to the instrument while movement of the manually operable means connected to said one end of said sheath changes the curvature of the latter to also transmit the movement of said one end of said sheath through said core to said instrument, said sheath being longitudinally incompressible.

8. In a camera, in combination, support means; automatic means for automatically setting the camera according to the lighting conditions, said automatic means including an instrument movably carried by said support means and including a moving coil member which is movable along a predetermined path with respect to the remainder of the instrument and which automatically assumes a position according to the lighting conditions; index means located at that part of said path to which said moving coil member must be moved to zero its movement according to the lighting conditions; three manually operable means for respectively manually setting the exposure time, the aperture, and for introducing the factor of film speed; an elongated, arcuate sheath having one end fixed to the manually operable means for introducing the factor of film speed and having an opposite, fixed end; an elongated core extending slidably through said sheath and beyond the latter, said core having one end fixed to one of the remaining manually operable means and its opposite end connected to said instrument so that the latter will be displaced with respect to said support means in response to movement of said one manually operable means or said manually operable means for introducing the factor of film speed; and releasable lock means for releasably locking the other of the remaining manually operable means to the manually operable means for introducing the factor of film speed at one of the plurality of selected positions relative thereto, whereby said sheath and core act to totalize the settings made by all of the manually operable means and to provide proper setting of the camera when said plurality of manually operable means are manipulated to align the moving coil member with said index means.

9. In a camera, in combination, support means; automatic means for automatically setting the camera, said automatic means including an instrument movably carried by said support means and having a moving coil member movable along a predetermined path for assuming with respect to said instrument positions determined by the lighting conditions; index means located along the path of movement of said moving coil member for indicating the position to which the moving coil member must be moved to zero its deflection according to the lighting conditions, said automatic means including a scanning means which moves into engagement with said moving coil member during automatic setting of the camera; a pair of coaxial rotary rings which respectively participate in the setting of the exposure time and aperture, said scanning means being operatively connected to one of said rings for turning the latter during automatic setting of the camera; spring-pressed means coupling the other of said rings to said one ring for turning movement therewith during automatic setting of the camera, so that both the exposure time and aperture are automatically set in response to movement of said scanning means into engagement with said moving coil member; a pair of manually operable means for respectively introducing manually settings of the same factors which are automatically introduced by said automatic means; transmission means for transmitting and totalizing the combined movement of said pair of manually operable means to said instrument for moving the latter with respect to said support means, whereby when said moving coil member is aligned with said index the operator will know that the camera has been properly set manually, one of said manually operable means turning said other ring in opposition to said spring-pressed coupling means during manual setting of the camera, said transmission means consisting of an elongated flexible sheath and an elongated flexible core member extending through and beyond said sheath.

10. In a camera as recited in claim 9, the ring which is operatively connected to said scanning means to be turned thereby forming one of the pair of rings for setting a diaphragm of the camera, and the manually operable means which is used for manually setting the diaphragm being operatively connected to the other of said latter pair of rings.

11. In a camera, in combination, support means; automatic means for automatically setting the camera, said automatic means including an electrical instrument movably carried by said support means and having a moving coil member which assumes positions, with respect to the remainder of the instrument, according to the lighting conditions; index means with which the moving coil member can be aligned to zero the deflection of the moving coil member; manually operable means for manually setting the camera; transmission means operatively connecting said manually operable means to said instrument for moving the latter during manual setting of the camera so that when said moving coil member is aligned with said index means the operator knows that the camera has been properly set with said manually operable means, said manually operable means including at least one manually operable member, said transmission means consisting of an elongated flexible sheath and an elongated flexible core member extending through and beyond said sheath; and releasable detent means cooperating with said one manually operable member for releasably maintaining the latter in the position to which it is moved during manual setting of the camera.

12. In a camera, in combination, support means; automatic means for automatically setting the camera, said automatic means including an electrical instrument movably carried by said support means and including a moving coil member; a pair of manually operable means for manually setting the camera; a sheath having one end operatively connected to one of said manually operable means for movement therewith; an elongated flexible core extending through and beyond said sheath and having one end connected to the other of said manually operable means, the other end of said core being connected to said instrument so that movement of said other manually operable means is transmitted through said core to said instrument; and positioning means fixed to the other end of said sheath, said one manually operable means being movable between an automatic position in which it is placed during automatic operation of the camera and a manual position to which it is displaced for manual setting of the camera and said one manually operable means being operatively connected to said positioning means for displacing the end of said sheath which is connected to said positioning means along said core to the same extent and in the same direction as the end of said sheath which is fixed to said one manually operable means during movement of the latter from the automatic to the manual position, whereby the electrical instrument is not displaced during changeover from automatic to manual operation.

13. In a camera, in combination, support means; automatic means for automatically setting the camera, said automatic means including an electrical instrument movably carried by said support means and including a moving coil member; a pair of manually operable means for manually setting the camera; a sheath having one end operatively connected to one of said manually operable means for movement therewith; an elongated flexible core extending through and beyond said sheath and having one end connected to the other of said manually operable means, the other end of said core being connected to said instrument so that movement of said other manually operable means is transmitted through said core to said instrument; and positioning means fixed to the other end of said sheath, said one manually operable means being movable between an automatic position in which it is placed during automatic operation of the camera and a manual position to which it is displaced for manual setting of the camera and said one manually operable means being operatively connected to said positioning means for displacing the end of said sheath which is connected to said positioning means along said core to the same extent and in the same direction as the end of said sheath which is fixed to said one manually operable means during movement of the latter from the automatic to the manual position, whereby the electrical instrument is not displaced during changeover from automatic to manual operation, said positioning means including a plate supported for turning movement about a predetermined axis and having a camming portion, said one manually operable means including a movable member having a pin engaging said camming portion and the configuration of said camming portion being such that during movement of said one manually operable means to changeover from automatic to manual operation said pin displaces said plate for shifting the end of said sheath which is connected to said plate to the same extent and in the same direction as the end of said sheath which is connected to said one manually operable means.

14. In a camera as recited in claim 13, said movable member which carries said pin forming part of a structure for setting the exposure time of the camera so that manipulation of said one manually operable means sets the exposure time, means for introducing the factor of film speed, said latter means being connected to said one end of said sheath and releasable lock means releasably locking said one manually operable means to said means for introducing the factor of exposure time so that it is through the latter means that said one manually operable means is connected to said one end of said sheath.

15. In a camera, in combination, support means; automatic means for automatically setting the camera, said automatic means including an electrical instrument movably carried by said support means and having a moving coil member which is deflected from a predetermined starting position with respect to the remainder of the electrical instrument according to the lighting conditions; manually operable means for manually setting the camera, said manually operable means being operatively connected to said electrical instrument for displacing the latter relative to said support means; a first index carried by said moving coil member for movement therewith; a second index aligned with said first index when said moving coil member is in said starting position thereof, whereby said manually operable means for setting the camera is manipulated to displace said instrument relative to said support means until said first index is aligned with said second index to indicate when the camera has been properly set by said manually operable means; and indicating means visible to the operator when said moving coil member is in said starting position thereof and indicating when there is insufficient light available for making a proper exposure, said indicating means being carried by said moving coil member for movement therewith.

16. In a camera, in combination, support means; automatic means for automatically setting the camera, said automatic means including an electrical instrument movably carried by said support means and having a moving coil member which is deflected from a predetermined starting position with respect to the remainder of the electrical instrument according to the lighting conditions; manually operable means for manually setting the camera, said manually operable means being operatively connected to said electrical instrument for displacing the latter relative to said support means; a first index carried by said moving coil member for movement therewith; a second index aligned with said first index when said moving coil member is in said starting position thereof, whereby said manually operable means for setting the camera is manipulated to displace said instrument relative to said support means until said first index is aligned with said second index to indicate when the camera has been properly set by said manually operable means; indicating means visible to the operator when said moving coil member is in said starting position thereof and indicating when there is insufficient light available for making a proper exposure, said indicating means being carried by said moving coil member for movement therewith; means for directing into a viewfinder of the camera an image of said first and second indexes as well as of said indicating means so that the latter are visible during the viewing of the subject through the viewfinder, said first index and indicating means not only being carried by said moving coil member for movement therewith but also being located directly beside each other.

17. In a camera, in combination, support means; an electrical instrument supported for rotary movement by said support means and including a rotary moving coil member which is displaceable from a predetermined starting position with respect to the remainder of the instrument in response to the lighting conditions; a rotary carrier member supported by said support means for turning movement independently of said instrument and being coaxial therewith; a first index carried by said rotary carrier member for rotary movement therewith; first indicating means also carried by said rotary carrier member for turning movement therewith and indicating to the operator that a proper exposure can be made; positioning means positioning said rotary carrier member with said first indicating means in alignment with said moving coil member when the latter is in said starting position thereof when the camera is to be operated automatically and positioning said first index member in alignment with said moving coil member when the latter is in said starting position thereof when the camera is to be operated manually; a second index member carried by said moving coil member for movement therewith and adapted to be aligned with said first index member when the camera is operated manually; and second indicating means carried by said moving coil member for movement therewith and indicating that a proper exposure cannot be made, said second indicating means covering said first indicating means as long as said moving coil member remains in the region of said starting position thereof and said first indicating means is in alignment with said moving coil member in the starting position thereof.

18. In a camera, as recited in claim 17, automatic means for automatically setting the camera, said electrical instrument forming part of said automatic means; and manually operable means for manually setting the camera, said manually operable means being operatively connected to said instrument for aligning said second index with said first index during manual setting of the camera.

19. In a camera, in combination, a pair of adjustable means for determining the extent to which film in the camera is exposed; light meter means including an electrical instrument and including a pointer which is movable along a predetermined path with respect to the remainder of the instrument and which automatically assumes a position according to the lighting conditions and including index means; a pair of manually operable means respectively coacting with said pair of adjustable means for manually setting them; and totalizing transmission means actuated by said manually operable means for bringing said pointer and said index means into alignment to provide a proper setting of said adjustable means, said totalizing means including an elongated sheath and an elongated flexible core member extending through and beyond said sheath, said elongated flexible core member having one end connected to said light meter means for moving the latter to bring said pointer and said index means into alignment, the opposite end of said core member and the one end of said sheath being respectively fixed to said pair of manually operable means and positioning means determining the position of the other end of said sheath, whereby said core member totalizes its own movements and deflections of said one end of said sheath to position said instrument accordingly, said sheath having an arcuate configuration.

References Cited by the Examiner
UNITED STATES PATENTS

| | | | |
|---|---|---|---|
| 2,354,315 | 7/1944 | Hermann | 95—10 |
| 3,013,478 | 12/1961 | Gebele | 95—10 |
| 3,063,352 | 11/1962 | Engelsmann | 95—10 |
| 3,087,396 | 4/1963 | Winkler | 95—10 |
| 3,126,800 | 3/1964 | Maas | 95—10 |

FOREIGN PATENTS

| | | |
|---|---|---|
| 861,192 | 12/1952 | Germany. |
| 972,746 | 9/1959 | Germany. |

NORTON ANSHER, *Primary Examiner.*